US012433582B2

(12) United States Patent
Yeoh et al.

(10) Patent No.: US 12,433,582 B2
(45) Date of Patent: Oct. 7, 2025

(54) DEPTH PENETRATION LIMITER FOR A TISSUE REPAIR DEVICE

(71) Applicants: Smith & Nephew, Inc., Memphis, TN (US); Smith & Nephew Orthopaedics AG, Zug (CH); Smith & Nephew Asia Pacific Pte. Limited, Singapore (SG)

(72) Inventors: Han Teik Yeoh, Hopkinton, MA (US); Matthew D. Cunningham, Lakeville, MA (US); Geoffrey Ian Karasic, Milton, MA (US); Rick Fu, Randolph, MA (US)

(73) Assignees: SMITH & NEPHEW, INC., Memphis, TN (US); SMITH & NEPHEW ORTHOPAEDICS AG, Zug (CH); SMITH & NEPHEW ASIA PACIFIC PTE. LIMITED, Singapore (SG)

( * ) Notice: Subject to any disclaimer, the term of this patent is extended or adjusted under 35 U.S.C. 154(b) by 447 days.

(21) Appl. No.: 17/909,963

(22) PCT Filed: Feb. 12, 2021

(86) PCT No.: PCT/US2021/017933
§ 371 (c)(1),
(2) Date: Sep. 7, 2022

(87) PCT Pub. No.: WO2021/188236
PCT Pub. Date: Sep. 23, 2021

(65) Prior Publication Data
US 2023/0109413 A1    Apr. 6, 2023

Related U.S. Application Data
(60) Provisional application No. 62/990,057, filed on Mar. 16, 2020.

(51) Int. Cl.
*A61B 17/04*    (2006.01)
*A61B 17/06*    (2006.01)

(52) U.S. Cl.
CPC ...... *A61B 17/0401* (2013.01); *A61B 17/0469* (2013.01); *A61B 17/06* (2013.01);
(Continued)

(58) Field of Classification Search
CPC ............ A61B 17/0401; A61B 17/0469; A61B 17/06; A61B 2017/0409; A61B 2017/06052
See application file for complete search history.

(56) References Cited

U.S. PATENT DOCUMENTS 9,629,620 B2 * 4/2017 Argentine .......... A61B 17/0467
2009/0062742 A1 * 3/2009 Rotella .............. A61B 17/3496
604/110

(Continued)

OTHER PUBLICATIONS

Japanese Application No. 2022-549299, Notice of Reasons for Rejection, dated Sep. 5, 2024, 7 pages.

*Primary Examiner* — Andrew P. Restaino
(74) *Attorney, Agent, or Firm* — ArentFox Schiff LLP; Joseph M. Maraia; Marlo Schepper Grolnic

(57) ABSTRACT

Depth penetration limiters for use with meniscal repair devices which have a built-in, self-stopper feature to prevent the limiter from disengaging from the device housing. The self-stopper feature is a cantilevered flexure on a bottom surface of the limiter that deflects as it is moved through the housing. As the flexure passes the edge of a recess in the housing, the flexure returns to its original shape, trapping the flexure within the recess and preventing further distal movement of the limiter/depth tube. A connection feature on the limiter provides increased pull-off resistance of the depth tube from the limiter.

10 Claims, 6 Drawing Sheets

(52) U.S. Cl.
CPC ................ *A61B 2017/0409* (2013.01); *A61B 2017/06052* (2013.01)

(56) References Cited

U.S. PATENT DOCUMENTS

| | | | | |
|---|---|---|---|---|
| 2010/0023024 A1* | 1/2010 | Zeiner | ................ | A61B 17/0469 606/144 |
| 2010/0130989 A1* | 5/2010 | Bourque | ............ | A61B 17/0482 606/144 |
| 2016/0324636 A1* | 11/2016 | Rourke | ................ | A61F 2/2442 |
| 2018/0119861 A1* | 5/2018 | Eichberger | ............ | F16L 37/252 |

* cited by examiner

DEPTH PENETRATION LIMITER FOR A TISSUE REPAIR DEVICE

CROSS-REFERENCE TO RELATED APPLICATIONS

This application is the U.S. national phase entry under 35 U.S.C. § 371 of International Application No. PCT/US2021/017933, filed Feb. 12, 2021, entitled DEPTH PENETRATION LIMITER FOR A TISSUE REPAIR DEVICE, which in turn claims priority to and benefit of U.S. Provisional Application No. 62/990,057, filed Mar. 16, 2020, the contents of which are incorporated herein by reference in their entirety for all purposes.

BACKGROUND

Fibrous tissue wounds, such as muscle, ligament, and meniscal tears, can be repaired arthroscopically using sutures. To close a fibrous tissue wound, a surgeon often inserts a needle of a tissue repair device into the tissue to successively deploy two anchors attached to the same suture on opposite sides of the wound, and reduces the length of the suture between the two anchors to close the sides of the wound. A number of such tissue repair devices use a finger-engageable, sliding limiter that moves a depth tube to control the penetration depth of the delivery needle. However, currently, there are no features stopping the limiter from inadvertently being removed from the device housing. When pushed or pulled from the housing of the device, the surgeon must reinsert the limiter into the housing manually, with the risk of prolonging the operative duration. Furthermore, it can be difficult to couple the limiter to the depth tube due to the high surface friction of the mating features. Therefore, a secondary operation is often required to increase the inner diameter of the depth tube before coupling the limiter to the depth tube.

SUMMARY

Described herein is a depth penetration limiter for use with a meniscal repair device which has a built-in, self-stopper feature to prevent the limiter from disengaging from the device housing. The self-stopper feature is a cantilevered flexure on a bottom surface of the limiter that deflects as it is moved through the housing. As the flexure passes the edge of a recess in the housing, the flexure returns to its original shape, trapping the flexure within the recess and preventing further distal movement of the limiter/depth tube. Additionally, a connection feature on the limiter advantageously provides increased pull-off resistance of the depth tube from the limiter.

Further examples of the tissue repair devices of this disclosure may include one or more of the following, in any suitable combination.

In examples, a tissue repair device of this disclosure includes a handle having a proximal end and a distal end, and a needle assembly disposed at least partially within a channel extending through the handle. A depth tube including a cannulation is configured to receive at least a portion of the needle assembly therein. A limiter member includes a housing disposed within the handle and a shaft extending from the distal end of the handle. The shaft is configured to engage the cannulation of the depth tube. The limiter member has a finger-engageable actuator for allowing axial movement of the depth tube relative to the needle assembly. The housing of the limiter member includes a flexure configured to engage a recess in the housing to limit distal movement of the limiter member relative to the housing.

In further examples, a proximal side of the flexure includes a cantilevered surface configured to allow for proximal movement of the limiter member relative to the housing. In examples, an outer surface of the shaft of the limiter member has at least one connection feature for increasing pull-out resistance between the shaft of the limiter member and the cannulation of the depth tube. In examples, the at least one connection feature is at least one circumferential rib formed by a conical section of the shaft of the limiter member. In other examples, the at least one connection feature is a plurality of barbs on an outer surface of the shaft of the limiter member. In examples, the handle has a hub coupled to a distal end of a tube extending through the handle, and the housing of the limiter member is disposed within the hub. In examples, a top portion of the housing extends through an open slot in the hub. In examples, a proximal portion of the depth tube and a distal end of the needle assembly include coordinated markings for indicating a tissue penetration depth of the needle assembly. In examples, the depth tube is comprised of a flexible material such that a proximal end of the depth tube configured to stretch about an outer surface of the shaft of the limiter member. In examples, the limiter member includes tabs for successively engaging grooves of the handle upon longitudinal movement of the limiter member within the handle.

Further examples of a tissue repair device of this device include a handle having a proximal end and a distal end, and a needle assembly disposed at least partially within a channel extending through the handle. A depth tube including a cannulation is configured to receive at least a portion of the needle assembly therein. A limiter member includes a housing disposed within the handle and a shaft extending from the distal end of the handle. The shaft is configured to engage the cannulation of the depth tube. The limiter member has a finger-engageable actuator for allowing axial movement of the depth tube relative to the needle assembly. An outer surface of the shaft of the limiter member includes at least one connection feature for increasing pull-out resistance between the shaft of the limiter member and the cannulation of the depth tube.

In further examples, the housing of the limiter member includes a flexure configured to engage a recess in the housing to limit distal movement of the limiter member relative to the housing. In examples, a proximal side of the flexure includes a cantilevered surface configured to allow for proximal movement of the limiter member relative to the housing. In examples, the at least one connection feature is at least one circumferential rib formed by a conical section of the shaft of the limiter member. In other examples, the at least one connection feature is a plurality of barbs on an outer surface of the shaft of the limiter member. In examples, the handle includes a hub coupled to a distal end of a tube extending through the handle, and the housing of the limiter member is disposed within the hub. In examples, a top portion of the housing extends through an open slot in the hub. In examples, a proximal portion of the depth tube and a distal end of the needle assembly include coordinated markings for indicating a tissue penetration depth of the needle assembly. In examples, the depth tube is comprised of a flexible material such that a proximal end of the depth tube is configured to stretch about an outer surface of the shaft of the limiter member. In examples, the limiter member includes tabs for successively engaging grooves of the handle upon longitudinal movement of the limiter member within the handle.

These and other features and advantages is apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The disclosure is more fully understood by reference to the detailed description, in conjunction with the following figures, wherein.

DETAILED DESCRIPTION

Figure 1:
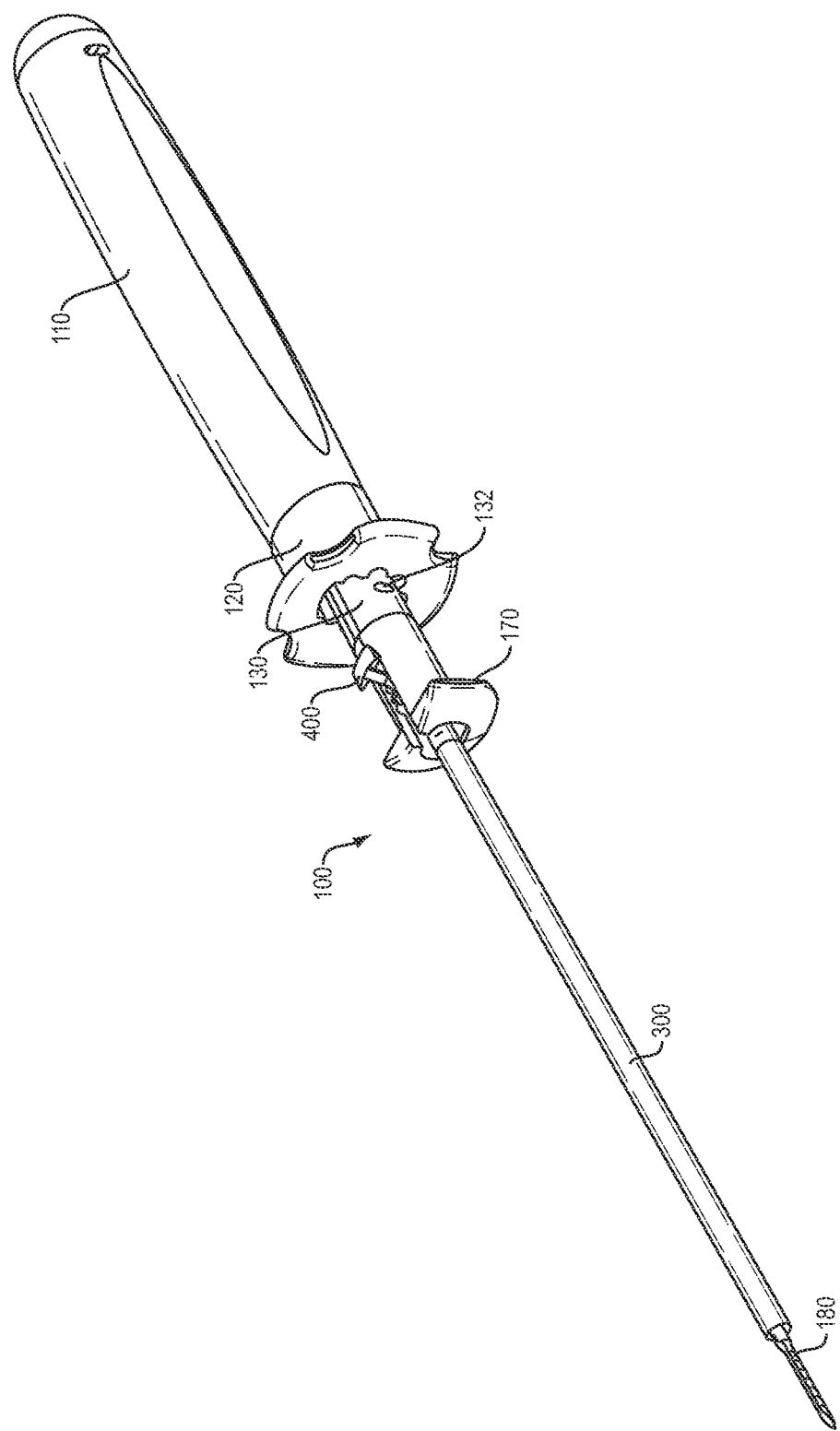
FIG. 1 illustrates a perspective view of a tissue repair device, including a depth penetration limiter of this disclosure.

In the description that follows, like components have been given the same reference numerals, regardless of whether they are shown in different examples. To illustrate example(s) in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

As used in the specification and claims, for the purposes of describing and defining the invention, the terms "about" and "substantially" are used to represent the inherent degree of uncertainty that may be attributed to any quantitative comparison, value, measurement, or other representation. The terms "about" and "substantially" are also used herein to represent the degree by which a quantitative representation may vary from a stated reference without resulting in a change in the basic function of the subject matter at issue. "Comprise," "include," and/or plural forms of each are open ended and include the listed parts and can include additional parts that are not listed. "And/or" is open-ended and includes one or more of the listed parts and combinations of the listed parts. Use of the terms "above," "below" and the like is intended only to help in the clear description of the present disclosure and are not intended to limit the structure, positioning and/or operation of the tissue repair device in any manner.

Turning now to FIG. 1, an example of a tissue repair device 100, including the depth penetration limiter 400 of the present disclosure, is shown in an assembled view. The device 100 generally includes a handle 110, a knob 120 coupled to the handle 110, a tube 130 disposed within the knob 120 and the handle 110, and a hub 170 coupled to the tube 130. The depth penetration limiter 400 of this disclosure is disposed within the hub 170 and coupled to a depth tube 300, as further described below. A needle assembly 180 extends through the depth tube 300 and houses at least one suture anchor (not shown) for deployment from the needle assembly 180 into tissue. Other non-limiting examples of the handle 110, the knob 120, the tube 130, the hub 170 and the needle assembly 180 are disclosed in U.S. Pat. No. 8,888,798 to Bourque et al., the entire contents of which are incorporated herein by reference.

Figure 2A:
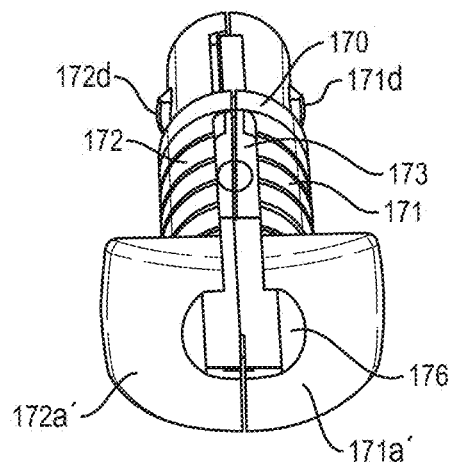
FIGS. 2A-C are detailed views of a hub of the tissue repair device of FIG. 1.
Figure 2B:
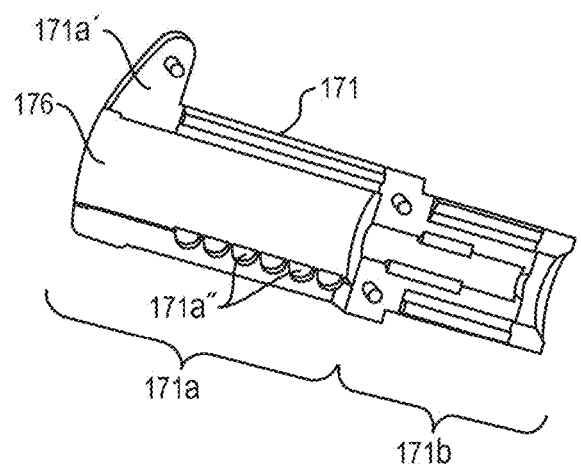
Figure 2C:
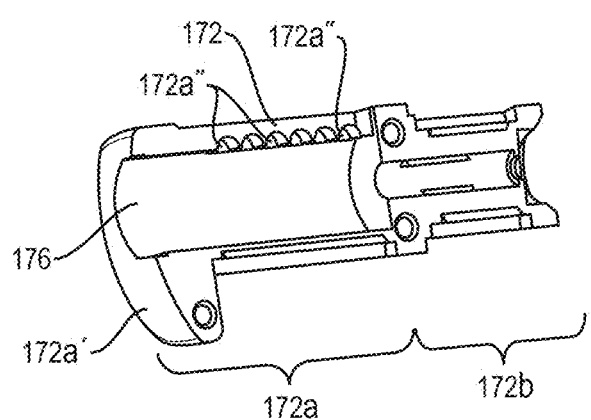

Turning now to FIGS. 2A-C, examples of the hub 170 are shown in detailed views. FIG. 2A shows the assembled hub 170 having a first part 171 (FIG. 2B) and a second part 172 (FIG. 2C). When assembled, the first part 171 and the second part 172 define a cannulation 176 extending through the hub 170. Both the first part 171 and the second part 172 include a first section 171a, 172a and a second section 171b, 172b. An open slot 173 extends between the first sections 171a, 172a in communication with the cannulation 176. The first sections 171a, 172a also include a front portion 171a', 172a' and grooves 171a'',172a'', the purpose of which will be described in more detail below. Each part 171, 172 also includes tabs 171d, 172d located on an outer surface of the second sections 171b, 172b. The second sections 171b, 172b are housed within the tube 130 (FIG. 1) such that the tabs 171d, 172d are disposed within holes 132 of the tube 130, thereby coupling the hub 170 to the tube 130.

Figure 3A:
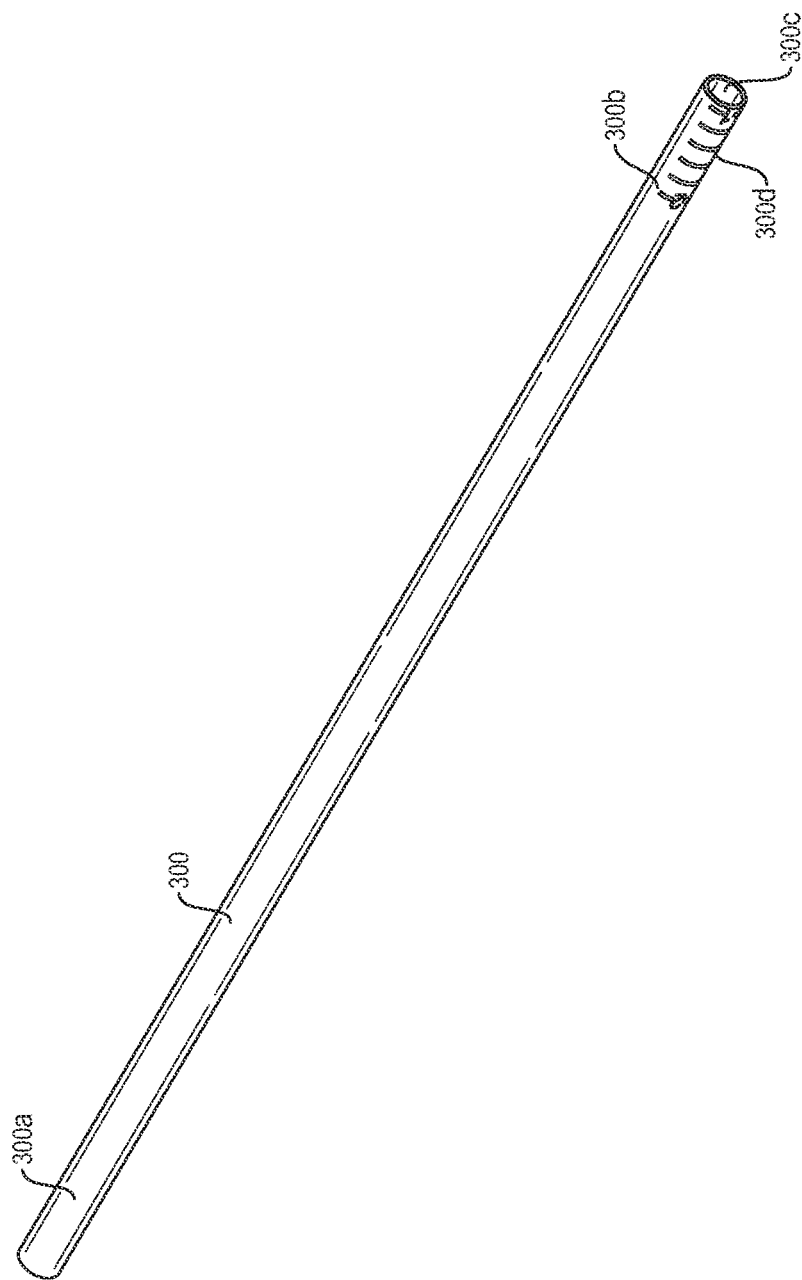
FIGS. 3A and 3B illustrate a depth tube for attachment to the depth penetration limiter of this disclosure.

Turning now to FIG. 3A, an example of a depth tube 300 is shown in a detailed view. The depth tube 300 includes a distal portion 300a, a proximal portion 300b, and a cannulation 300c for passage of the needle assembly 180. In examples, the proximal portion 300b of the depth tube 300 includes markings 300d. The depth tube 300 can be made of a flexible material such that the proximal portion 300b of the depth tube 300 can be stretched about an outer surface of the depth penetration limiter 400, as further described below.

Figure 3B:
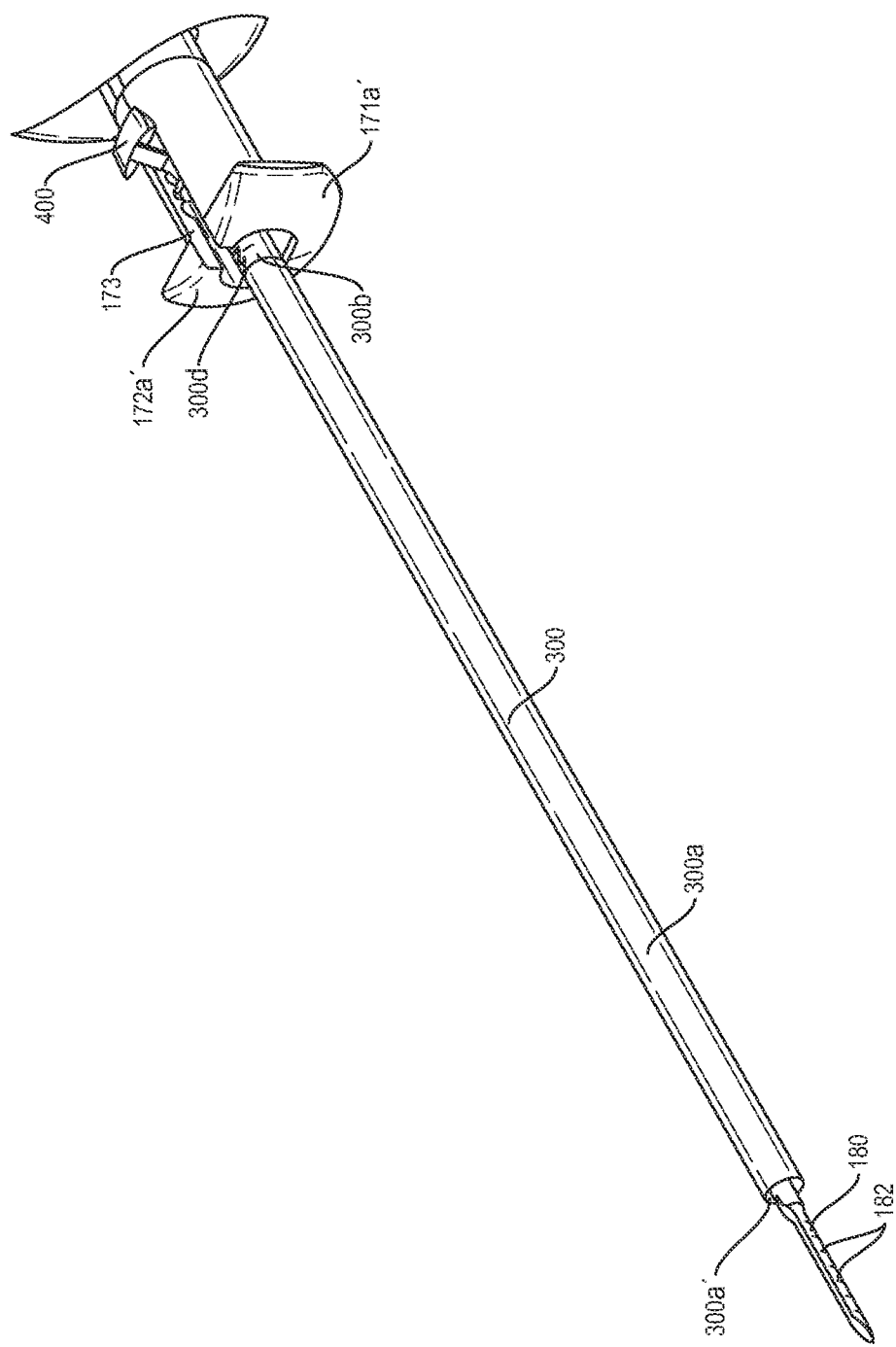

As shown in FIG. 3B, the depth penetration limiter 400 of this disclosure is coupled to the proximal portion 300b of the depth tube 300 while the needle assembly 180 extends from the distal portion 300a of the depth tube 300. A distal end of the needle assembly 180 also includes markings 182 for indicating a penetration depth of the needle assembly 180 during repair. In use, as the depth tube 300 is moved longitudinally along the needle assembly 180, the front portions 171a', 172a' of the hub 170 and a front portion 300a' of the depth tube 300 will continue to align with the respective markings 300d, 182 such that the markings 300d, 182 with which the fronts portions 171a', 172a', 300a' are respectively aligned will be equivalent to each other. For example, when the front portions 171a', 172a' are aligned with a marking 300d that corresponds to 1 mm, the front portion 300a' is also aligned with a marking 182 that corresponds to 1 mm.

Figure 4A:
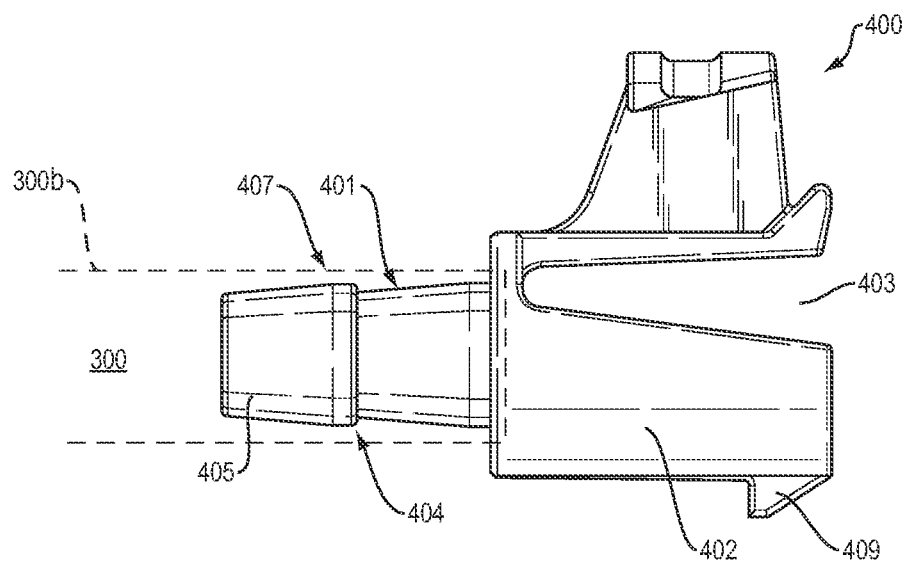
FIGS. 4A-C illustrate examples of the depth penetration limiter of this disclosure.
Figure 4B:
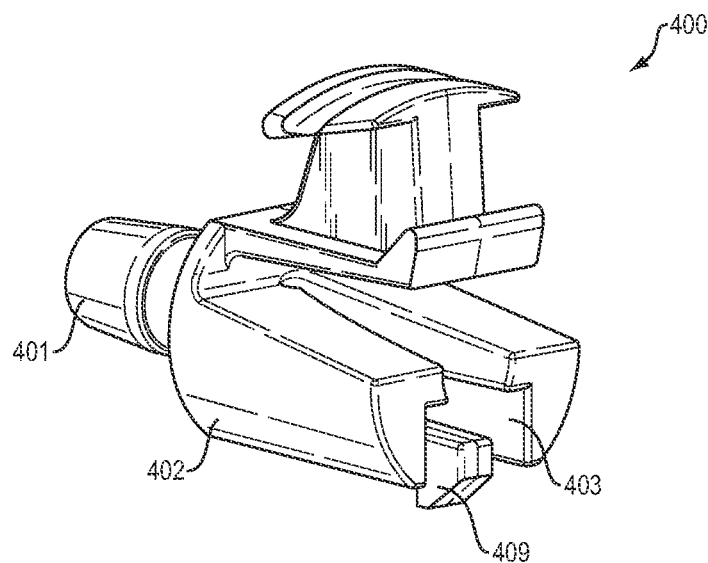
Figure 4C:
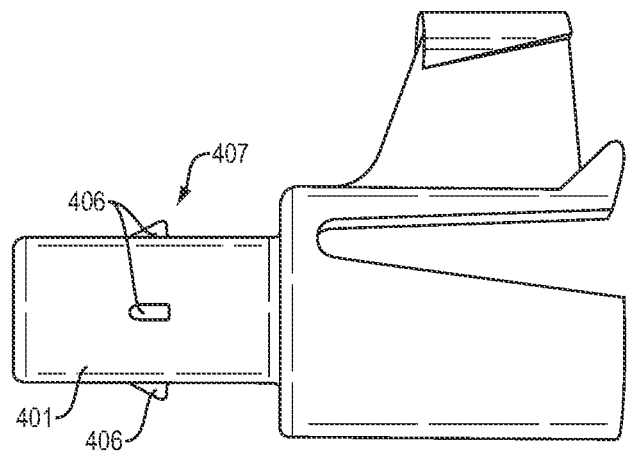
Figure 4D:
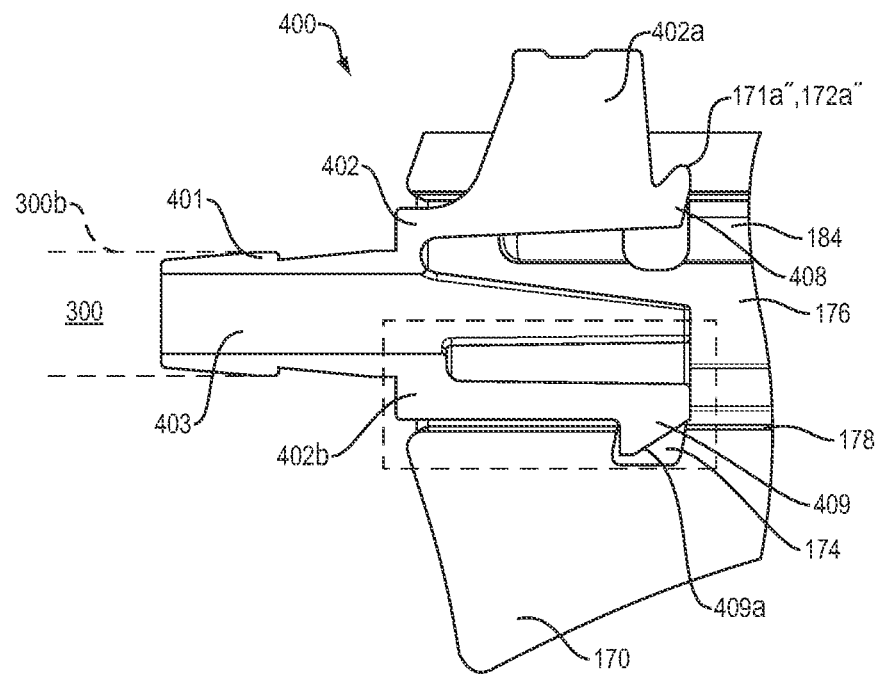
FIG. 4D illustrates an example of the depth penetration limiter of FIGS. 4A-C coupled to a hub of a tissue repair device.

Turning now to FIGS. 4A and 4B, the depth penetration limiter 400 of this disclosure is shown in a side view (FIG. 4A) and an isometric view (FIG. 4B). The depth penetration limiter 400 includes a shaft 401, a housing 402 coupled to the shaft 401, and a cannulation 403 for passage of the needle assembly 180 and/or an actuator 184 (FIG. 4D). In examples, a flexure 409 is coupled to an inner surface of the cannulation 403 such that the flexure extends below the housing 402, the purpose of which will be described in more detail below. The shaft 401 includes a connection feature 407 which is configured to couple the shaft 401 to the proximal portion 300b of the depth tube 300. In examples, the connection feature 407 is one or more circumferential ribs 404 defined by a cone-shaped section 405 of the shaft 401. In other examples, shown in FIG. 4C, the connection feature 407 is a plurality of barbs 406 disposed about a circumference of the shaft 401. In examples, a cross-section of the barbs 406 could be cylindrical, mirror-symmetric, rectangular, triangular, pentangular, star-shaped etc. The connection feature 407 is configured to provide sufficient assembly force as well as to increase pull-off resistance of the depth tube 300 from the shaft 401. The depth tube 300 can be assembled to the shaft 401 by stretching the proximal portion 300b of the depth tube 300 around the connection feature 407 and allowing the depth tube 300 to relax back around the surface of the shaft 401.

Further examples (not shown) of the depth tube 300 and/or the connection feature 407 are contemplated by this disclosure. For example, the depth tube 300 could include a window to act as a catch to the connection feature 407. Similarly, there could be many catches on the depth tube 300 acting as a ratchet-pawl style mechanism with the connection feature 407 of the shaft 401. In other examples, surface roughness, material combinations, and various other surface parameters could be adjusted on the depth tube 300 and/or the shaft 401 to achieve the design intent. In other examples, the connection feature 407 could be an asymmetric "mini-barb" requiring more force to remove from the depth tube 300 than to assemble to the depth tube 300. In further examples, a round cross-section of one of the depth tube 300 or the shaft 401 could be mated to a square cross-section of the other of the depth tube 300 or the shaft 401. In other examples, the shaft 401 and the depth tube 300 could utilize a helical interface to screw together. In further examples, the mating surface between the depth tube 300 and the shaft 401 could be an inner diameter of a boss on the shaft 401 and an outer diameter of the depth tube 300.

Turning now to FIG. 4D, in further examples of the depth penetration limiter 400 of this disclosure, the housing 402 has a top portion 402a for extending through the slot 173 in the hub 170 (FIG. 3B), and a bottom portion 402b connected to the shaft 401. The top portion 402a includes upper tabs 408. The housing 402 is located within the hub 170 such that the upper tabs 408 are located within the grooves 171a", 172a" of the hub 170. The cannulation 403 is configured to allow passage of an actuator 184 for deploying anchors from the needle assembly 180. Longitudinal movement of the depth tube 300 occurs via pressing on the top portion 402a of the housing 402 in a direction towards the bottom portion 402b, so as to remove the upper tabs 408 from one of the grooves 171a",172a". The housing 402 can thus be moved longitudinally and then the top portion 402a can be released such that the upper tabs 408 are deposited into other one of the grooves 171a",172a". Meanwhile, the flexure 409 deforms within the hub 170 and slides along a bottom surface 178 of the cannulation 176 of hub 170. However, once the upper tabs 408 reach the distal-most grooves 171a", 172a", the flexure 409 is configured to engage recesses 174 in the bottom surface 178 of the hub 170 and return to their original shape, preventing further distal movement of the housing 402 relative to the hub 170. Notably, a proximal side 409a of the flexure 409 is cantilevered such that proximal movement of the housing 402 allows the flexure 409 to slide out of the recesses 174 to enable proximal movement of the depth tube 300. The cantilever of the proximal side 409a furthermore evenly distributes stress along the length of the cantilever.

Further examples (not shown) of the depth penetration limiter 400 are contemplated by this disclosure. In examples, the recess 174 could be on the depth tube 300 while the flexure 409 is on the needle assembly 180. In other examples, a limiting strap could allow travel of the depth penetration limiter 400 over a defined distance, but stop travel when extended beyond the range of the strap. In further examples, a flexure catch could be integrated into the current flexure 409.

One skilled in the art will realize the disclosure may be embodied in other specific forms without departing from the spirit or essential characteristics thereof. The foregoing examples are therefore to be considered in all respects illustrative rather than limiting of the disclosure described herein. Scope of the disclosure is thus indicated by the appended claims, rather than by the foregoing description, and all changes that come within the meaning and range of equivalency of the claims are therefore intended to be embraced therein.

The invention claimed is:

1. A tissue repair device comprising:
   a handle having a proximal end, and a distal end;
   a hub operatively coupled to the handle;
   a needle assembly disposed at least partially within a channel extending through the hub and the handle;
   a depth tube including a cannulation configured to receive at least a portion of the needle assembly therein; and
   a limiter member comprising a housing disposed within the hub and a shaft extending from a distal end of the hub, the shaft configured to engage the cannulation of the depth tube, the limiter member defining a cannulation extending along a longitudinal axis for passage of an actuator into the needle assembly, the limiter member having a flexible portion positioned above the longitudinal axis and engageable by a user for allowing axial movement of the depth tube relative to the needle assembly;
   wherein the housing of the limiter member comprises a flexure positioned below the longitudinal axis and configured to engage a recess in the hub to limit distal movement of the limiter member relative to the hub, the flexure coupled to an inner surface of the cannulation of the limiter member and extending proximally from the cannulation of the limiter member.

2. The tissue repair device of claim 1, wherein a proximal side of the flexure includes a cantilevered surface configured to allow for proximal movement of the limiter member relative to the hub.

3. The tissue repair device of claim 1, wherein an outer surface of the shaft of the limiter member comprises at least one connection feature for increasing pull-out resistance between the shaft of the limiter member and the cannulation of the depth tube.

4. The tissue repair device of claim 3, wherein the at least one connection feature is at least one circumferential rib formed by a conical section of the shaft of the limiter member.

5. The tissue repair device of claim 3, wherein the at least one connection feature is a plurality of barbs on the outer surface of the shaft of the limiter member.

6. The tissue repair device of claim 1, wherein the hub is coupled to a distal end of a tube extending through the handle.

7. The tissue repair device of claim 1, wherein the flexible portion of the limiter member extends through an open slot in the hub.

8. The tissue repair device of claim 1, wherein a proximal portion of the depth tube and a distal end of the needle assembly include coordinated markings for indicating a tissue penetration depth of the needle assembly.

9. The tissue repair device of claim 1, wherein the depth tube is comprised of a flexible material such that a proximal end of the depth tube is configured to stretch about an outer surface of the shaft of the limiter member.

10. The tissue repair device of claim 1, wherein the limiter member comprises a tab for successively engaging grooves of the hub upon longitudinal movement of the limiter member within the hub, the tab positioned proximally of the flexible portion.

\* \* \* \* \*